(12) United States Patent
Li et al.

(10) Patent No.: US 8,009,549 B2
(45) Date of Patent: Aug. 30, 2011

(54) CARRIER ALLOCATION METHOD IN MULTI CELL ORTHOGONAL FREQUENCY DIVISION MULTIPLE ACCESS SYSTEM

(75) Inventors: Haitao Li, Beijing (CN); Jifeng Li, Kanagawa (JP)

(73) Assignee: Panasonic Corporation, Osaka (JP)

( * ) Notice: Subject to any disclaimer, the term of this patent is extended or adjusted under 35 U.S.C. 154(b) by 656 days.

(21) Appl. No.: 12/092,950

(22) PCT Filed: Nov. 16, 2006

(86) PCT No.: PCT/JP2006/322883
§ 371 (c)(1),
(2), (4) Date: May 7, 2008

(87) PCT Pub. No.: WO2007/058270
PCT Pub. Date: May 24, 2007

(65) Prior Publication Data
US 2009/0122887 A1    May 14, 2009

(30) Foreign Application Priority Data
Nov. 17, 2005   (CN) .......................... 2005 1 0125462

(51) Int. Cl.
*H04J 11/00* (2006.01)
*H04J 1/00* (2006.01)
*H04J 4/00* (2006.01)
*G01R 31/08* (2006.01)

(52) U.S. Cl. ......... 370/203; 370/252; 370/343; 370/436
(58) Field of Classification Search .................. None
See application file for complete search history.

(56) References Cited

U.S. PATENT DOCUMENTS
| 6,181,683 | B1 | 1/2001 | Chevillat |
| 6,904,283 | B2 | 6/2005 | Li |
| 6,947,748 | B2 | 9/2005 | Li |
| 7,072,315 | B1 | 7/2006 | Liu |

(Continued)

FOREIGN PATENT DOCUMENTS
CN   1 351 787   8/2000
(Continued)

OTHER PUBLICATIONS

Cheong Yui Wong et al., "A Real-time Sub-carrier Allocation Scheme for Multiple Access Downlink OFDM Transmission", Proceedings of IEEE 50$^{th}$ Vehicular Technology Conference,1999, p. 1124-1128.

(Continued)

*Primary Examiner* — Nittaya Juntima
(74) *Attorney, Agent, or Firm* — Dickinson Wright PLLC

(57) ABSTRACT

Provided is a carrier allocation method in a multi cell OFDMA system capable of improving the system capacity and the bit error rate performance. In the method, a user terminal U which has received broadcast information (S101) uses an empty carrier to transmit a known symbol to a base station device (S103). The base station device estimates an average channel gain of an empty carrier block by using the received known symbol (S104), compares the channel gain sizes of the respective carrier blocks according to the estimated average channel gain and allocates a carrier block having a large channel gain to the user terminal (S105), and compares channel gains of the respective carriers in the carrier block allocated to the user terminal and selects a carrier having a channel gain lower than a predetermined threshold value (S106).

10 Claims, 8 Drawing Sheets

U.S. PATENT DOCUMENTS

| | | | |
|---|---|---|---|
| 7,355,962 B2* | 4/2008 | Li et al. | 370/208 |
| 7,567,625 B2* | 7/2009 | Oh et al. | 375/299 |
| 7,710,918 B2* | 5/2010 | Jung et al. | 370/329 |
| 2002/0034158 A1 | 3/2002 | Wang | |
| 2002/0147017 A1 | 10/2002 | Li | |
| 2003/0050032 A1 | 3/2003 | Masaki | |
| 2004/0228283 A1 | 11/2004 | Naguib | |
| 2005/0099937 A1* | 5/2005 | Oh et al. | 370/207 |

FOREIGN PATENT DOCUMENTS

| | | |
|---|---|---|
| CN | 1 504 024 | 2/2002 |
| CN | 1092436 C | 10/2002 |
| CN | 1 404 291 | 3/2003 |
| JP | 2002-111627 | 4/2002 |
| JP | 2004-523934 | 8/2004 |
| JP | 2004-529524 | 9/2004 |
| JP | 2004-537875 | 12/2004 |
| JP | 2005-502218 | 1/2005 |
| JP | 2005-142935 | 6/2005 |
| WO | 00/49782 | 8/2000 |
| WO | 02/73870 | 2/2002 |
| WO | 2004/105294 | 12/2004 |
| WO | 2005/018186 | 2/2005 |

OTHER PUBLICATIONS

Chinese Office Action, dated Feb. 12, 2010.

International Search Report dated Feb. 13, 2007.

3GPP TSG-RAN Working Group 1 #41, Tdoc R1-050390, ZTE, "EUTRA Uplink Multiple Access for Downlink and Uplink," May 2005, pp. 1-6.

3GPP TSG-RAN WG1 Ad Hoc on LTE, R1-050590, NTT DoCoMo, "Physical channels and multiplexing in evolved UTRA downlink," Jun. 2005, pp. 1-24.

3GPP TSG-RAN WG1 Ad Hoc on LTE, R1-050591, NTT DoCoMo, "Physical channels and multiplexing in evolved UTRA uplink," Jun. 2005, pp. 1-21.

* cited by examiner

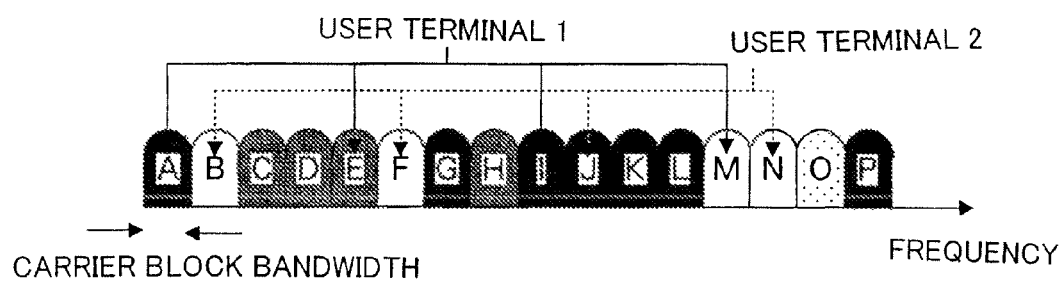
FIG. 1A
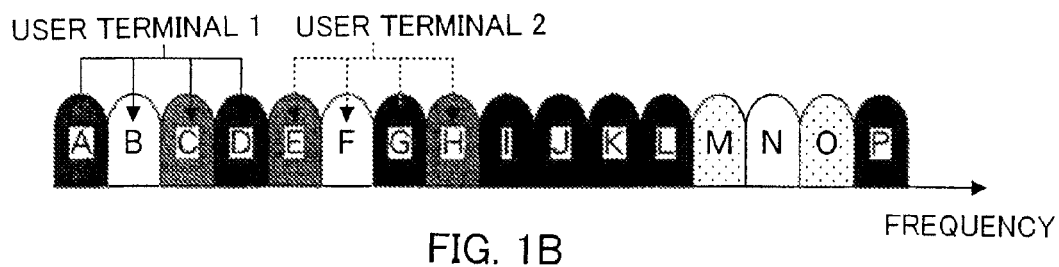
FIG. 1B
FIG. 1

CARRIER ALLOCATION METHOD IN MULTI CELL ORTHOGONAL FREQUENCY DIVISION MULTIPLE ACCESS SYSTEM

TECHNICAL FIELD

The present invention relates to a carrier assignment method in a multicell orthogonal frequency division multiple access system of information transmission system such as wireless LAN, fixed wireless access, mobile communication and terrestrial digital television broadcasting, using the OFDM (Orthogonal Frequency Division Multiplexing) technique, and of a communication method supporting the information transmission system.

BACKGROUND ART

As the integration of a wireless network, multimedia technique and the Internet is advanced, demands for kinds and quality of wireless communication operations are increased. To meet requirements for wireless multimedia and high-speed data transmission, the new generation wireless communication system needs to be developed. Next generation wireless system includes a new technique such as OFDM over a physical layer and network layer.

According to OFDM, by dividing a channel into many orthogonal subchannels to divide an overall broadband frequency selective channel into relatively flat subchannels in the frequency domain and inserting a CP (Cyclic Prefix) as a guard interval between OFDM symbols, it is possible to reduce ISI (Inter Symbol Interference) significantly. OFDM has an advantage of strong robustness to multipath, and, consequently, is introduced into system such as xDSL, DVB, DAB, WLAN and IEEE 802.16 smoothly. At present, according to LTE (Long-Term Evolution) of 3GPP (Third Generation Partnership Project), the OFDM technique is a key technology for downlink (uplink) transmission.

To use mobile communication system using the OFDM technique, a multi-user terminal access needs to be supported. Existing multiple access schemes such as TDMA (Time Division Multiple Access), FDMA (Frequency Division Multiple Access) and CDMA (Code Division Multiple Access) can be used for the OFDM system.

In the OFDM-TDMA system, each user's terminal apparatus (hereinafter "user terminal") occupies a unique time slot, and, in the time slot, all frequencies are allocated to this single user terminal. The advantage of TDMA is that time slots are assigned dynamically at different data rates. MAC (Media Access Control) protocol of HiperLan/2 based on European telecommunications standards institute employs TDMA. OFDM-FDMA assigns part of all carriers in OFDM symbols to user terminals, and is also referred to as "OFDMA (Orthogonal Frequency Division Multiple Access)." The advantage of OFDM-FDMA is that carriers are assigned to each user dynamically when the transmitting side has acquired CSI (Channel State Information).

OFDMA-TDMA, which is a hybrid multi-access technique combining OFDMA and TDMA, has advantages of both OFDMA and TDMA. That is, by assigning the carriers to different user terminals in each time slot, OFDMA-TDMA can realize precise, flexible frequency resource assignment and yield multi-user terminal diversity gain. This technique is adopted in new wireless communication systems based on OFDM, such as broadband wireless access based on IEEE 802.16 standards and IEEE 802.20 based on Flash-OFDM. OFDMA-TDMA is referred to as a standard transmission scheme in a disclosure of 3GPP LTE (for example, see Non-Patent Documents 1, 2 and 3).

According to the disclosure of LTE, there are two transmission methods in the uplink of OFDMA-TDMA. FIGS. 1A and 1B illustrate an example showing distributed FDMA and localized FDMA, respectively.

One transmission method is frequency diversity OFDMA, which has a characteristic of, in each time slot, distributing the carriers to be assigned to a user terminal to all carriers of the OFDM symbol in the frequency domain, and which is referred to as "distributed FDMA." According to this distributed FDMA, for example, as shown in FIG. 1A, carriers A, E, I, and M are assigned to the user terminal of user 1, and carriers B, F, J and N are assigned to the user terminal of user 2, sequentially.

Other transmission method is frequency domain scheduling OFDMA-TDMA, which has a characteristic of assigning part of consecutive carriers of all carriers in the OFDM symbol to a user terminal using a scheduling algorism, and which is referred to as "localized FDMA." In this localized FDMA, for example, as shown in FIG. 1B, carriers A to D are assigned to the user terminal of user 1 and carriers E to H are assigned to the user terminal of user 2, sequentially. This group of a plurality of carriers to be assigned to each user is referred to as "carrier block (chunk)."

Distributed FDMA is already adopted to IEEE 802.16 standard. A Localized FDMA system has an advantage of high spectrum efficiency and can suppress inter-cell interference by OFDM carrier scheduling in the frequency domain, and, consequently, can support frequency multiplexing in a multicell system having one multiplexing element, that is, the localized FDMA system can use the same frequency in all cells in the network.

Non-Patent Document 1: 3GPP R1-050390, ZTE, EUTRA Uplink Multiple Access for Downlink and Uplink, RAN1 41bis Non-Patent Document 2: 3GPP R1-050590, NTT DoCoMo, Physical channels and multiplexing in evolved UTRA downlink, RAN1 Ad Hoc on LTE Non-Patent Document 3: 3GPP R1-050591, NTT DoCoMo, Physical channels and multiplexing in evolved UTRA uplink, RAN1 Ad Hoc on LTE

DISCLOSURE OF INVENTION

Problems to be Solved by the Invention

By the way, when a user terminal accesses an OFDM system, a key point is how a base station apparatus assigns to each user, a carrier block (chunk) comprised of several carriers which meet certain standards such as maximum SINR, and meets demands for quality of the operation service of each user terminal.

At present, this kind of system is hardly studied. In particular, according to a multicell OFDM system using an OFDMA system in the multicell environment, the key point for practical use is how the multicell OFDM system performs scheduling for a user terminal to assign a carrier block meeting certain standards.

That is, to perform OFDM communication in the multicell OFDMA system, first, a base station apparatus transmits pilot symbols to be used for timing synchronization, and, after that, transmits pilot symbols mapped in pilot carriers in a distributed manner and used for channel estimation.

In this case, to assign a carrier block meeting certain standards to a user terminal, the base station apparatus needs to know channel gain of the carrier block in advance to be assigned to the user terminal.

However, before the user terminal accesses a channel at first, the base station apparatus does not know the channel estimation value and cannot know the channel gain of the carrier block to be assigned to the user terminal. Consequently, the base station apparatus cannot assign a carrier block meeting certain standards to the user terminal.

Thus, according to this kind of conventional carrier assignment methods in the multicell OFDMA system, there is a possibility that there are carriers where a reception level is low in the carrier block assigned to a user terminal by a base station apparatus.

Consequently, according to the conventional carrier assignment methods in the multicell orthogonal OFDM system, there is a disadvantage that a user terminal cannot acquire data transmitted by carriers having a low channel gain in the carrier block assigned by a base station apparatus, and this makes system capacity and bit error rate performance deteriorate.

It is therefore an object of the present invention to provide a carrier assignment method in an OFDMA system that improves system capacity and bit error rate performance by assigning a carrier block meeting certain standards to a terminal apparatus by a base station apparatus in a simple manner.

Means for Solving the Problem

The carrier assignment according to the present invention employs a configuration including the steps of: assigning in a base station apparatus, carrier blocks orthogonal to each other to adjacent sectors and reporting information on available carrier blocks to a terminal apparatus; transmitting in the terminal apparatus, a known symbol to the base station apparatus using the available carrier blocks; receiving in the base station apparatus, the known symbol and estimating an average channel gain of the available carrier block using the known symbol; comparing in the base station apparatus, a channel gain between the available carrier blocks, and preferentially assigning a carrier block having a large average channel gain as a carrier block to be used by the terminal apparatus; and comparing in the base station apparatus, the channel gain of each carrier included in the carrier block assigned to the terminal apparatus and selecting a carrier having a lower channel gain than a threshold so as not to transmit data by the carrier.

Further, the base station apparatus according to the present invention employs a configuration having: a reporting section that reports information on available carrier blocks to a terminal apparatus; an average channel gain estimating section that estimates an average channel gain of each carrier block using a known symbol mapped in the available carrier block and transmitted by the terminal apparatus; and a carrier block assigning section that compares an average channel gain between available carrier blocks, and preferentially assigns a carrier block having a large average channel gain as a carrier block to be used by the terminal apparatus.

Advantageous Effect of the Invention

According to the present invention, a carrier block having a large channel gain can be assigned preferentially as a carrier block to be used by a terminal apparatus, so that it is possible to improve system capacity and bit error rate performance.

BRIEF DESCRIPTION OF DRAWINGS

FIG. 1A shows an example of distributed FDMA which is one transmission method in the uplink of OFDMA-TDMA and FIG. 1B shows an example of localized FDMA which is the other transmission method in the uplink of OFDMA-TDMA;

BEST MODE FOR CARRYING OUT THE INVENTION

An embodiment of the present invention will be explained below in detail with reference to the accompanying drawings. Further, the embodiment explained below does not limit the technical scope of the present invention. Further, numerical values in the following explanation do not limit the technical scope of the present invention, and a skilled person can change these numerical values arbitrarily where necessary.

Figure 2:
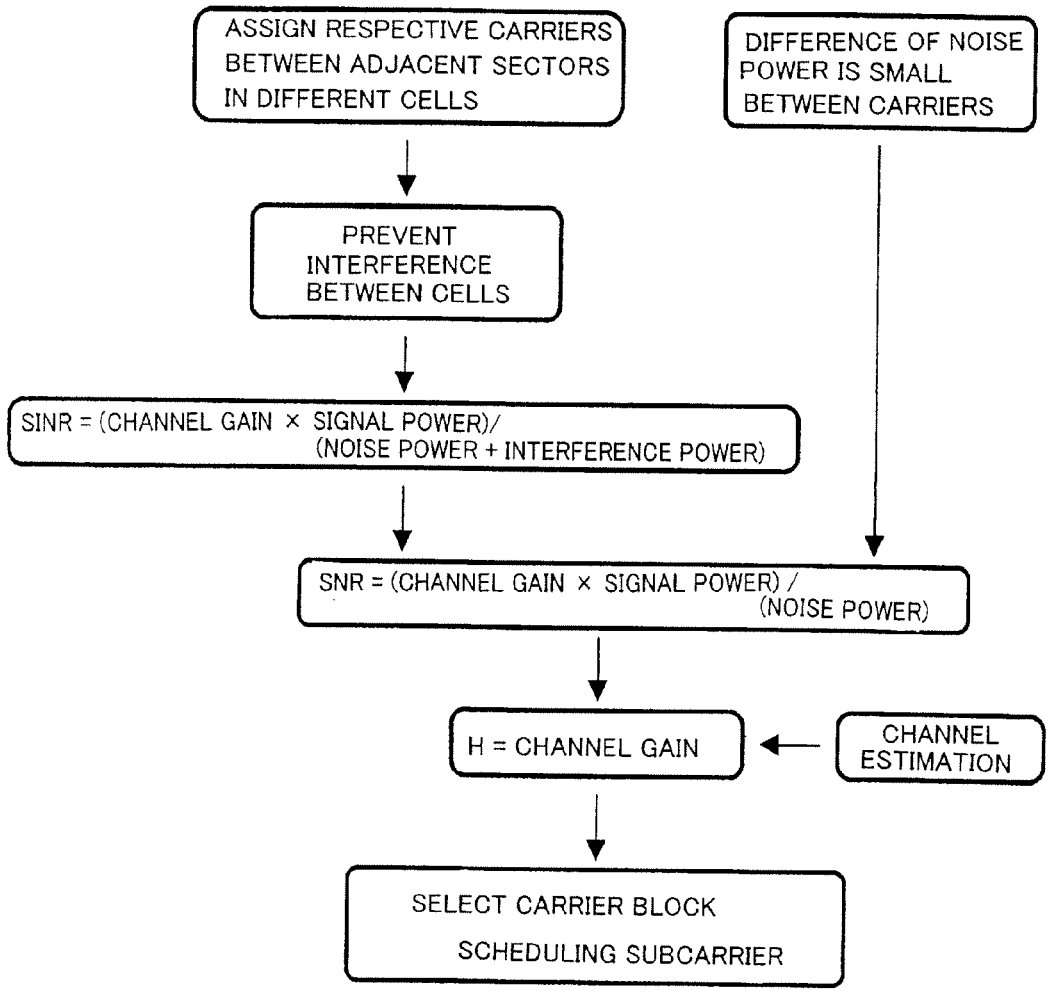
FIG. 2 shows a diagram explaining a principle of a communication method of a multicell OFDMA system according to the present invention.

First, the principle of the communication method of the multicell OFDMA system according to the present invention will be explained with reference to FIG. 2.

In the multicell OFDMA system, when a user terminal is positioned at a cell edge of an arbitrary base station apparatus, the user terminal is often interfered by signals for user terminals in adjacent cells of different base station apparatuses. Consequently, the multicell OFDMA system employs a method of preventing interference based on the idea that carriers are orthogonal to each other between adjacent sectors.

First, a base station apparatus divides one cell into several sectors and assigns different carriers between these sectors and sectors of adjacent cells. After that, the base station apparatus records the cell where there is a user terminal and the cell having the strongest interference on the user terminal, and assigns orthogonal carriers to the sector where there is the user terminal and sectors of adjacent cells. As described above, the base station apparatus performs processing in cooperation with base station apparatuses for sectors of adjacent cells to make transmission signals orthogonal to each other, and, consequently, prevents inter-cell interference such that a user terminal that is positioned at the cell edge is interfered by signals of user terminals in adjacent cells.

By this means, the base station apparatus can switch carrier scheduling based on the signal to interference noise ratio (SINR=(channel gain×signal power)/(noise power+interference power)) of carriers, into a carrier selection based on the signal to noise ratio (SNR=(channel gain×signal power)/A/ (noise power)) of the carriers. Further, taking into consideration the characteristic that the change (difference) of noise power between carriers is small, the base station apparatus simplifies the carrier selection significantly by performing a channel estimation based on channel gains of the carriers to perform carrier block scheduling.

Next, the base station apparatus starts data transmission without assigning data (i.e., mapping zero data) to carriers where a reception level is low in a carrier block. According to the present invention, these operations make it possible to achieve the object of improving system capacity and bit error rate performance, and, for an additional advantage, implement the present invention easily.

Figure 3:
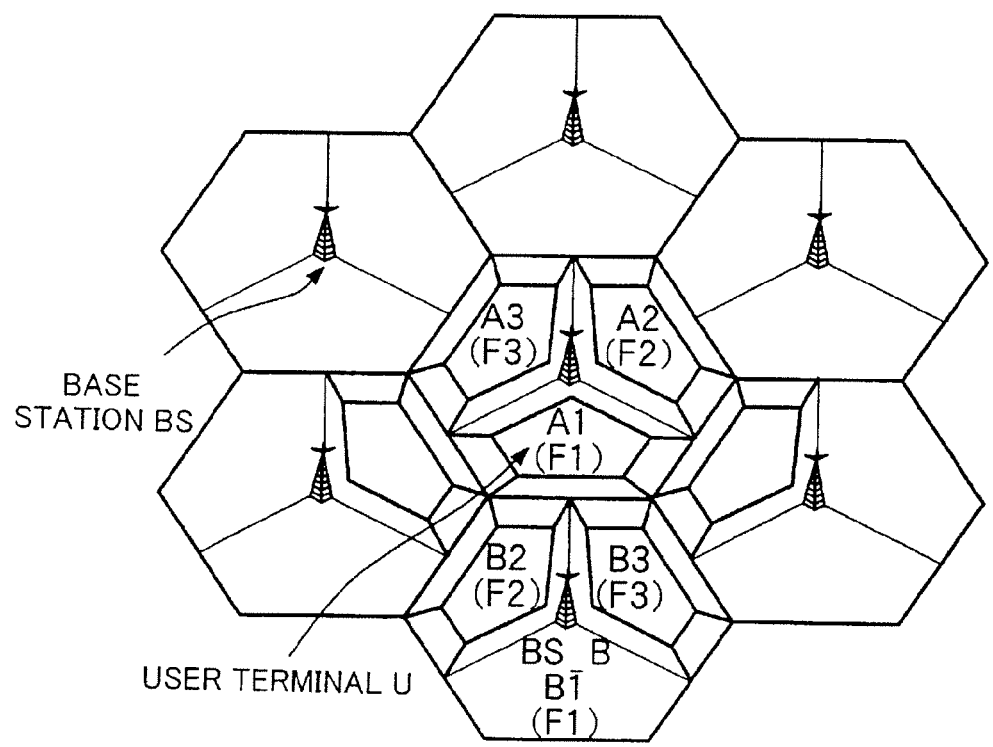
FIG. 3 is a schematic view showing a configuration of a multicell OFDMA system.

FIG. 3 shows a configuration of a multicell OFDMA system. According to this multicell OFDMA system, the shape of the cell for each base station apparatus BS is hexagonal like a honeycomb and each cell is surrounded by six other cells. Base station apparatus BS in each cell covers one cell and communicates with user terminal U in the cell. Here, to reduce interference caused by the same frequency in a cell and increase capacity, each cell needs to be divided into a plurality of sectors by providing sector antennas to the side of base station apparatus BS. FIG. 3 shows a case where each cell is divided into three sectors.

As a communication scheme to be used in this multicell OFDM system, the OFDMA-TDMA multiple access scheme is employed in downlink (data transmission from the side of base station apparatus BS to the side of user terminal U), and the localized FDMA transmission scheme is employed in uplink (data transmission from the side of user terminal U to the side of base station apparatus BS side).

Figure 4:
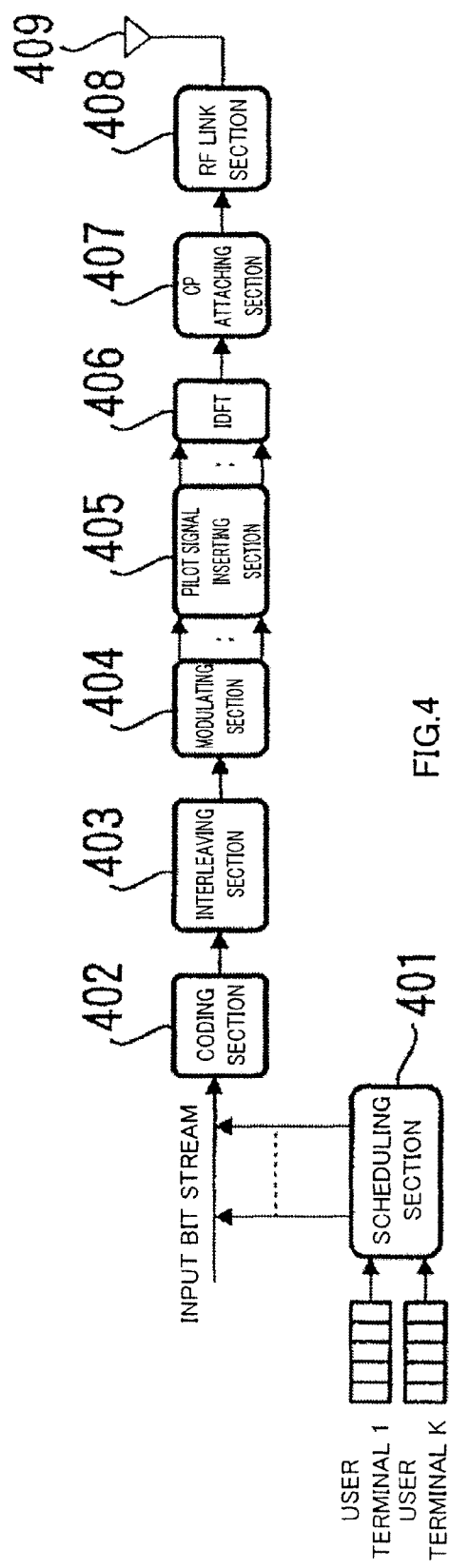
FIG. 4 is a block diagram showing a configuration of a base station apparatus according to an embodiment of the present invention.

FIG. 4 shows a configuration of base station apparatus BS. This base station apparatus BS employs a configuration having scheduling section 401, coding section 402, interleaving section 403, modulating section 404, pilot signal inserting section 405, IDFT 406, CP attaching section 407, RF link section 408 and antenna 409. Further, although FIG. 4 shows a configuration of the transmission system to transmit data to user terminal U, it goes without saying that base station apparatus BS provides the reception system to receive data to be transmitted from user terminal U.

Scheduling section 401 of base station apparatus BS identifies user terminal U connected in a certain time slot, and assigns to this user terminal U, a different carrier block from carrier blocks assigned to other user terminals. To be more specific, scheduling section 401 assigns assignment information on the carrier block to input bit streams to be transmitted to identified user terminal U, and transmits the result to coding section 402. Coding section 402 encodes the input bit streams for user terminal U and outputs the result to interleaving section 403. Interleaving section 403 interleaves data signals of the encoded input bit streams and outputs the result to modulating section 404. Modulating section 404 modulates the interleaved data signals by a predetermined scheme and outputs the result to pilot signal inserting section 405. Pilot signal inserting section 405 inserts a pilot signal into the data symbol inputted from modulating section 404, maps data signals and pilot signals in carriers of the carrier block assigned to user terminal U by scheduling section 401 and outputs the result to IDFT 406. IDFT 406 performs an IDFT transform for the data signal and pilot signal inputted from pilot signal inserting section 405, and outputs the result to CP attaching section 407. CP attaching section 407 forms a baseband transmission signal by attaching a CP (Cyclic Prefix) to the inputted data signal and pilot signal, and outputs the result to RF link section 408. RF link section 408 transmits by radio the received baseband signal via antenna 409 using a predetermined channel.

Figure 5:
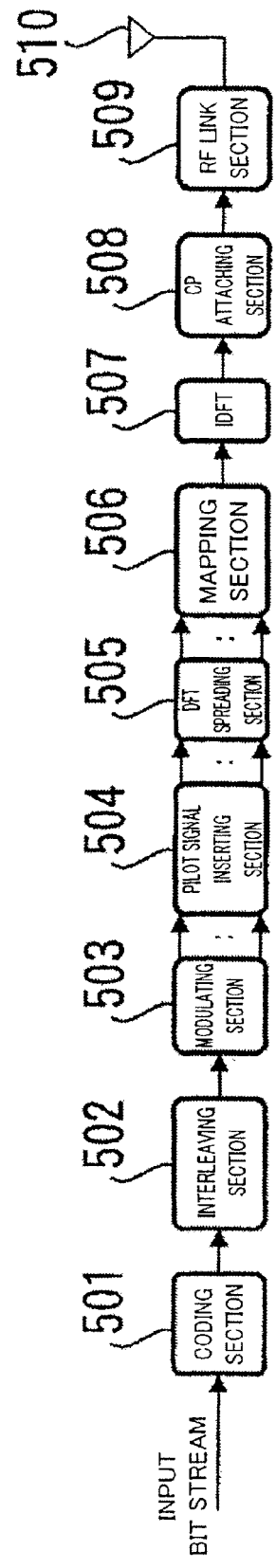
FIG. 5 is a block diagram showing a configuration of a user terminal towards the uplink.

FIG. 5 shows a configuration of user terminal U. This user terminal U employs a configuration having coding section 501, interleaving section 502, modulating section 503, pilot signal inserting section 504, DFT spreading section 505, mapping section 506, IDFT section 507, CP attaching section 508, RF link section 509 and antenna 510. Here, although FIG. 5 shows a configuration of the transmission system to transmit data to base station apparatus BS, it goes without saying that user terminal U provides the reception system to receive data to be transmitted from base station apparatus BS.

Coding section 501 of user terminal U encodes input bit streams for user terminal U and outputs the result to interleaving section 502. Interleaving section 502 interleaves data signals of the encoded input bit streams and outputs the result to modulating section 503. Modulating section 503 modulates the interleaved data signals by a predetermined scheme and outputs the result to pilot signal inserting section 504. Pilot signal inserting section 504 inserts a pilot signal into the inputted data symbol and outputs the result to DFT spreading section 505. DFT spreading section spreads (linear pre-coding) the data symbol block into which pilot signal inserting section 504 inserts a pilot signal, and outputs the result to mapping section 506. Mapping section 506 maps the spread data signal to carriers of the carrier block assigned by base station apparatus BS and outputs the result to IDFT section 507. IDFT section 507 performs an IDFT transform on the data symbol and pilot signal inputted from mapping section 506, and outputs the result to CP attaching section 508. CP attaching section 508 forms a baseband transmission signal by attaching a CP to the inputted data signal and pilot signal, and outputs the result to RF link section 509. RF link section 509 transmits by radio the received baseband signal via antenna 510 using a predetermined channel.

Next, at the cell edge between cell A of base station apparatus BS_A and cell B of base station apparatus BS_B, interference between cell A and cell B will be explained. In communication using a multicell OFDMA system, when user terminal U_A1 in cell A of base station apparatus BS_A is positioned at the cell edge, user terminal U_A1 is often interfered by signals for user terminal U_B1 in adjacent cell B of base station apparatus BS_B.

For example, when user terminal U_A1 in cell A, positioned near the cell edge between cell A and cell B, communicates with base station apparatus BS_A using carriers $f_1$ to $f_{64}$ and user terminal U_B1 in cell B communicates with base station apparatus BS_B using carriers $f_1$ to $f_{128}$, signals for user terminal U_B1, assigned to carriers $f_1$ to $f_{64}$ overlapped over between user terminal U_A1 and user terminal U_B1, are superposed upon the signals for user terminal U_A1, and, as a result, interference is caused. Unlike the CDMA system, in this kind of interference, the type of interference signals is the same, and, consequently, cannot be regarded as Gaussian distribution noise. By this means, if a base station apparatus tries to remove interference from the received signals of each user terminal side, the circuit configuration of the user terminal becomes complicated.

As a method of preventing this interference, there is a method of assigning carriers having different frequencies to adjacent cells in advance. Here, according to the multicell OFDMA system, it is preferable to employ a method of assigning the carriers having different frequencies to each sector of adjacent cells in advance.

Therefore, according to the multicell OFDMA system, as shown in FIG. 3, cell A where there is user terminal U_A1 is divided into three sectors A1, A2 and A3, and carrier blocks $f_{1-64}$, $f_{65-128}$ . . . are assigned to sectors A1, A2 and A3 in advance. In this case, sectors A1, A2 and A3 are made to have respective carrier block groups, that is, carrier block group F1 of sector A1 has carrier blocks $f_{1-64} \ldots f_{257-320}$, carrier block group F2 of sector A2 has carrier blocks $f_{321-384} \ldots f_{705-768}$ and carrier block group F3 of sector A3 has carrier blocks $f_{769-832} \ldots f_{961-1024}$. Here, carriers among sectors A1, A2 and A3 are orthogonal to each other. Further, when user terminal U_A1 in sector A1 is close to sectors B2 and B3 of adjacent cell B, base station apparatus BS_B assigns carrier block groups F2 and F3 to sectors B2 and B3, respectively.

As described above, by processing in cooperation with base station apparatus BS_B in adjacent cell B, user terminal U_A1 at the cell edge can prevent interference due to signals for user terminal U_B1 in adjacent cell B. Here, with this method, base station apparatus BS_B in cell B adjacent to cell A of base station apparatus BS_A needs to operate in cooperation with base station apparatus BS_A. This cooperating processing between base station apparatus BS_A and base station apparatus BS_B can be realized by connecting base station apparatuses BS_A and BS_B with the same RNC (Radio Network Controller) apparatus by wire.

Thus, according to the multicell OFDMA system, the carrier block group is assigned to each cell in the above-described way. Further, according to the multicell OFDMA system, the carrier block is assigned to user terminal U in each sector so that the spectrum efficiency of the system is maximum.

Figure 7:
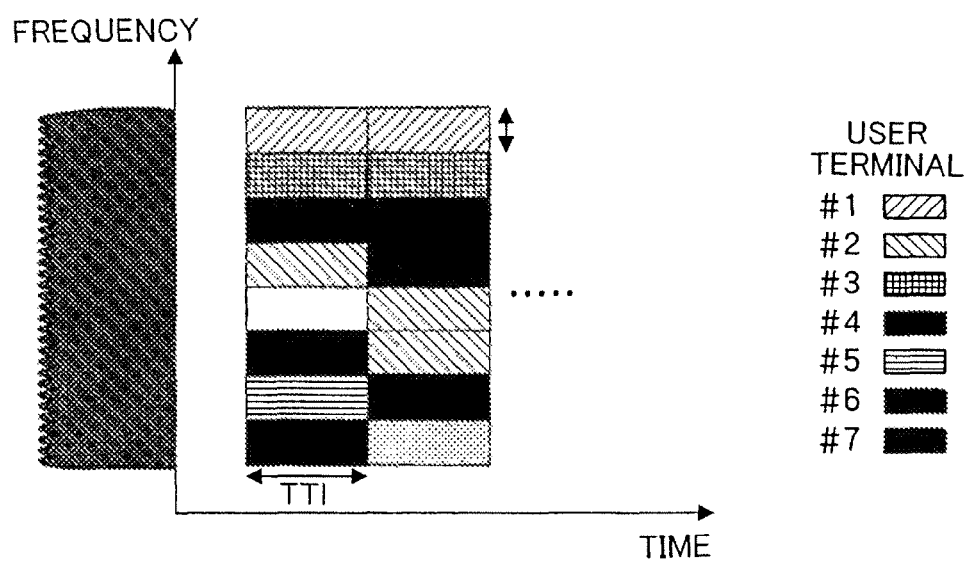
FIG. 7 shows an example of a carrier block to be assigned to a user terminal.

FIG. 7 shows an example of the unique carrier block assigned to each user. By the way, when a user terminal connects with a localized FDMA system, as shown in FIG. 7, the key matter is how to assign a carrier block (chunk) comprised of several consecutive carriers meeting certain standards (such as maximum SINR) to each user and meet demands for quality of the operation service of each user terminal.

Figure 6:
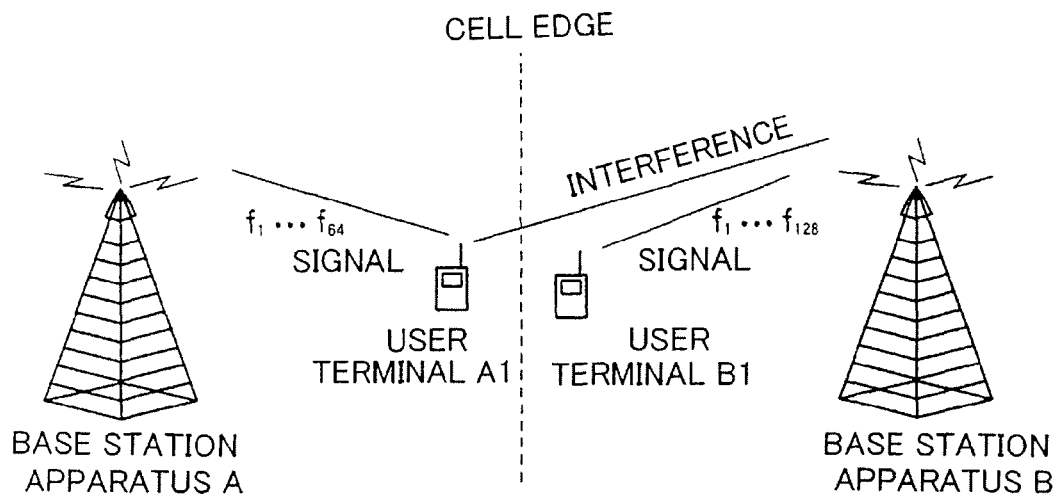
FIG. 6 shows a diagram explaining interference at cell edge of a base station apparatus in a multicell OFDMA system.

Therefore, for example, as shown in FIG. 6, according to the multicell OFDMA system, to prevent user terminal U_A1 positioned at the cell edge from being interfered by signals for user terminal U_B1 in adjacent cell B, as shown in FIG. 3, the interference is removed by assigning orthogonal carrier block groups to cell A where there is user terminal_A1 and adjacent cell B, or to sector A1 where there is user terminal_A1 and sectors B2 and B3 of adjacent cell B, and making transmission signals orthogonal to each other by cooperating processing between base station apparatus BS_A and base station apparatus BS_2 positioned in cells or sectors adjacent to cell A.

By this means, according to this multicell OFDMA system, as described above using FIG. 2, it is possible to switch carrier scheduling based on the SINR of carriers, into a carrier selection based on the SNR of the carriers. Further, according to the multicell OFDMA system, taking into consideration the characteristic that the difference of noise power between carriers is small, it is possible to simplify carrier selection significantly by performing a channel estimation based on the channel gain of the carriers to perform carrier scheduling.

Figure 8:
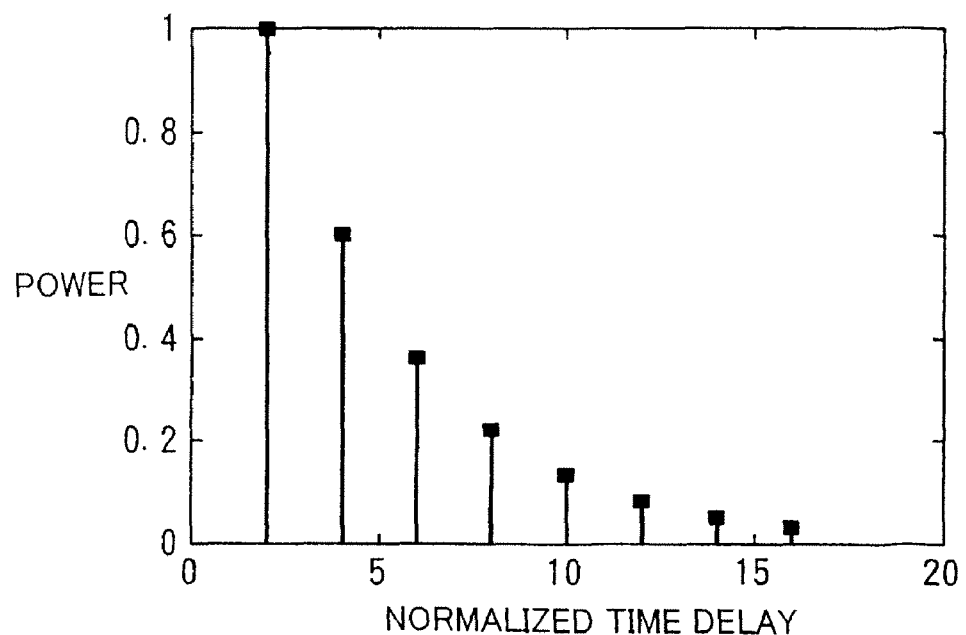
FIG. 8 illustrates a chart showing power distribution of multipath.

FIG. 8 illustrates a chart showing power distribution of multipath. Here, the power of each of eight paths shows an exponential decay. As shown in FIG. 8, the power of paths, acquired by normalizing the power of each path into the power of the first path, are [exp(0), exp(−1), exp(−2), exp(−4), exp(−5), exp(−6), exp(−7)].

Figure 9:
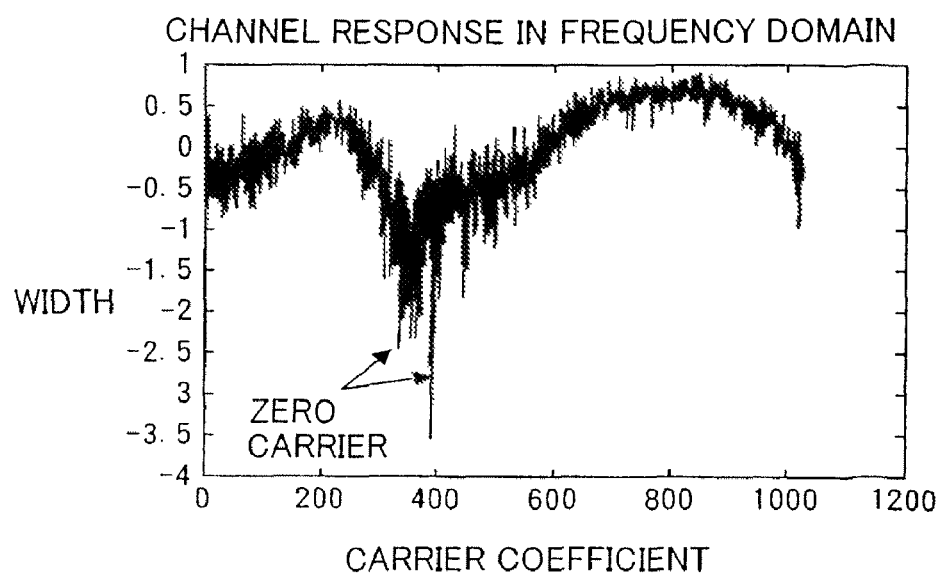
FIG. 9 illustrates a channel gain of a carrier block to be assigned to a user terminal.

FIG. 9 illustrates channel gain of carriers included in the carrier block to be assigned to user terminal U. The channel gain of the carriers, estimated after the timing symbol transmitted from base station apparatus BS is sent through each path shown in FIG. 8, is shown in FIG. 9, for example. Thus, generally, the gain fluctuates significantly with respect to each carrier of the carrier block assigned to user terminal U. Here, the data transmission performance is low in carriers where a reception level is low.

Figure 10:
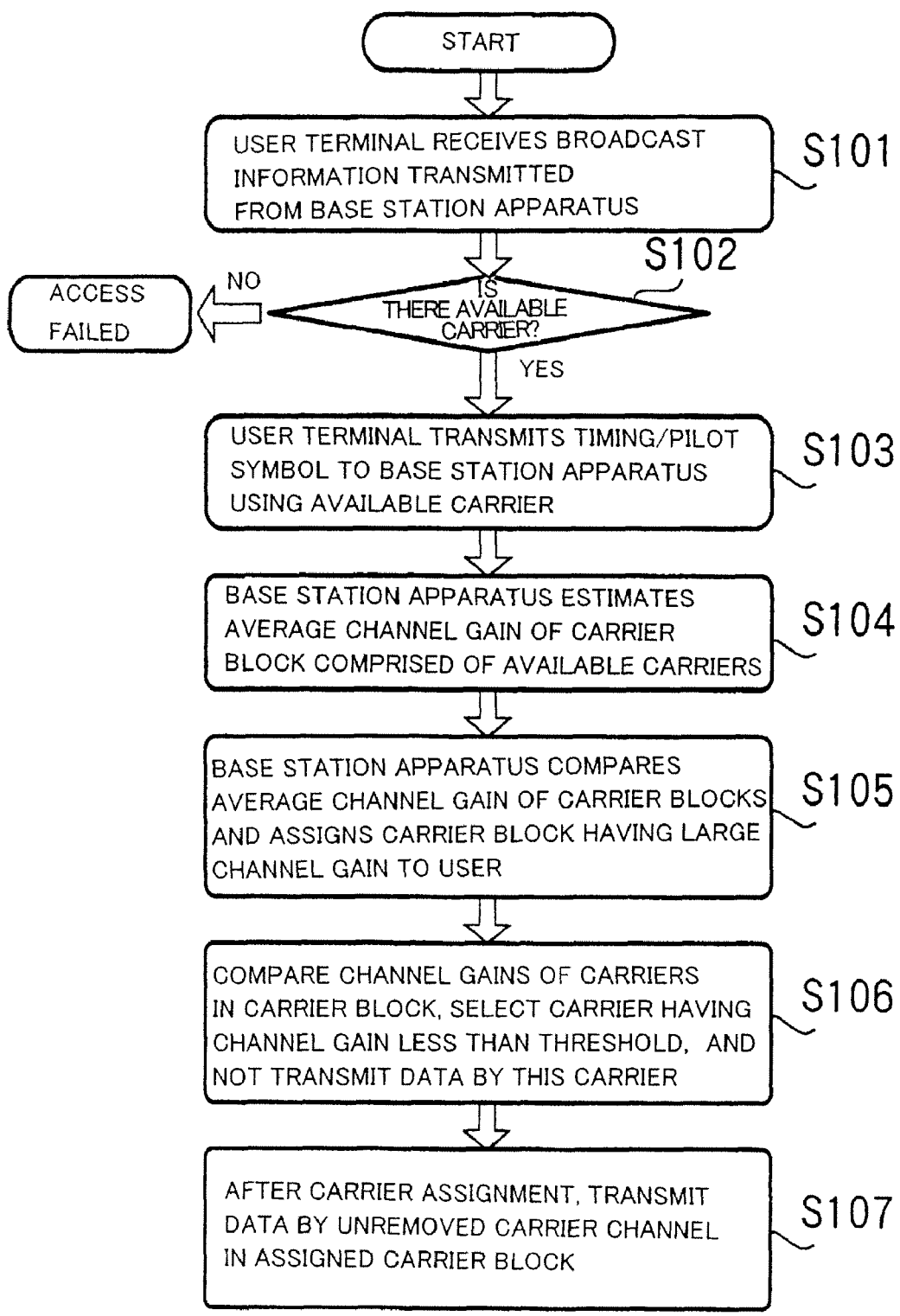
FIG. 10 illustrates a flowchart explaining a carrier assignment method according to an embodiment of the present invention.

Therefore, base station apparatus BS according to this multicell OFDMA system assigns carriers to user terminal U in the way shown in FIG. 10.

That is, as shown in FIG. 10, first, user terminal U receives broadcast information transmitted from base station apparatus BS upon connection with the multicell OFDMA system (step S101). User terminal U then decides whether or not there is an available carrier block in base station apparatus BS (step S102). Here, if there is no available carrier block in base station apparatus BS, user terminal U fails to connect with the multicell OFDMA system, and, as a result, processing ends.

In step S102, if user terminal U decides that there is an available carrier block in base station apparatus BS, user terminal U transmits to base station apparatus BS, the timing symbol and pilot symbol to be used for synchronization using the available carrier as a preparation to connect with the multicell OFDMA system (step S103).

If base station apparatus BS has received the pilot signal transmitted from user terminal U, base station apparatus BS estimates average channel gain of the carrier block comprised of available carriers using the pilot signal (step S104).

Next, base station apparatus BS compares the degree of channel gain between carrier blocks using the estimated average channel gain, and assigns a carrier block having a large channel gain to user terminal U (step S105).

Further, base station apparatus BS compares channel gain between the carriers of the carrier block assigned to user terminal U, selects the carrier having a lower channel gain than a threshold and does not transmit data by the selected carrier (step S106).

After base station apparatus BS has finished a carrier assignment to user terminal U as described above, base station apparatus BS starts data transmission by the channel having a greater channel gain than the threshold, in the carrier block (step S107).

For example, user terminal U to which carriers are assigned is positioned in sector A1 of FIG. 3 and base station BS can assign carriers $f_1$ to $f_{64}$ to user terminal U. Base station apparatus BS employs the carrier assignment method shown in FIG. 10 to assign a carrier block or multiple carrier blocks comprised of a predetermined number of carriers among carriers $f_1$ to $f_{64}$. Further, base station apparatus BS does not transmit data by the carrier having a lower channel gain than the threshold in the carrier block assigned to user terminal U.

That is, a carrier assignment method in this multicell orthogonal frequency division multiple access system employs a configuration including the steps of: assigning in a base station apparatus, carrier blocks orthogonal to each other to adjacent sectors and reporting information on available carrier blocks to a terminal apparatus; transmitting in the terminal apparatus, a known symbol to the base station apparatus using the available carrier blocks; receiving in the base station apparatus, the known symbol and estimating an average channel gain of the available carrier block using the known symbol; comparing in the base station apparatus, a channel gain between the available carrier blocks, and preferentially assigning a carrier block having a large average channel gain as a carrier block to be used by the terminal apparatus; and comparing in the base station apparatus, the channel gain of each carrier included in the carrier block assigned to the terminal apparatus and selecting a carrier having a lower channel gain than a threshold so as not to transmit data by the carrier.

Further, base station BS employs a configuration having: a reporting section that reports information on available carrier blocks to a terminal apparatus; an average channel gain estimating section that estimates an average channel gain of each carrier block using a known symbol mapped in the available carrier block and transmitted by the terminal apparatus; and a carrier block assigning section that compares an average channel gain between available carrier blocks, and preferentially assigns a carrier block having a large average channel gain as a carrier block to be used by the terminal apparatus.

As described above, FIG. 10 shows the process of assigning carriers to user terminal U by base station apparatus BS. Here, for example, in the TTD (Time Division Duplex) operation mode, the same operating frequency is shared and channel characteristics are opposite between uplink and downlink, and, consequently, a carrier assignment from the side of base station apparatus BS to the side of user terminal U and a carrier assignment from the side of user terminal U to the side of base station apparatus BS are equivalent.

Further, in the FDD (Frequency Division Duplex) operation mode, the operating frequency and channel characteristics are different between uplink and downlink. Consequently, carriers need to be assigned individually to the side of base station apparatus BS and the side of user terminal U. Actually, the operation of assigning carriers to the side of base station apparatus BS and the side of user terminal U individually, is complicated. Consequently, whether carriers are assigned to the side of base station apparatus BS or carriers are assigned to the side of user terminal U, needs to be decided based on the amount of traffic in uplink and downlink. For example, if data is mainly downloaded from base station BS to user terminal U, carriers should be assigned to the side of base station apparatus BS, which enables downlink transmission quality to be improved.

By the way, as described above, to perform OFDM communication, first, base station apparatus BS transmits pilot symbols used for timing synchronization, and, after that, transmits pilot symbols used for channel estimation and mapped in pilot carriers in a distributed manner. Carriers are assigned on conditions that channel gain is known in advance. However, the channel estimation value is not known before user terminal U connects with the system, and, consequently, a carrier block cannot be assigned to user terminal U.

Therefore, first, base station apparatus BS in the multicell OFDMA system estimates channel gain by the minimum mean square error method directly using the timing symbol received from user terminal U. For example, if the frequency domain timing signal for transmission is $X_P(n)$, the frequency domain timing signal for reception is $Y_P = X_P H_P + W$, and the channel gain is estimated using LS (Least Square). That is, the Euclidean distance of estimated error calculated by following equation 1 is minimum.

[1]

$$e(\hat{H}) = \|Y_P - X\hat{H}\|^2 \qquad \text{(Equation 1)}$$

After this equation 1 is expanded to calculate partial derivative, following equation 2 is yielded.

[2]

$$\frac{\partial}{\partial H}\|Y_P - X\hat{H}\|^2 \bigg|_{H=\hat{H}} = \hat{H}^H X^H X - Y_P^H X = 0 \qquad \text{(Equation 2)}$$

Here, "H" in equation 2 is the conjugate substitution of matrix. The channel gain expressed by following equation 3 is acquired from this equation 2.

[3]

$$\hat{H} = Y_P / X_P \qquad \text{(Equation 3)}$$

Figure 11:
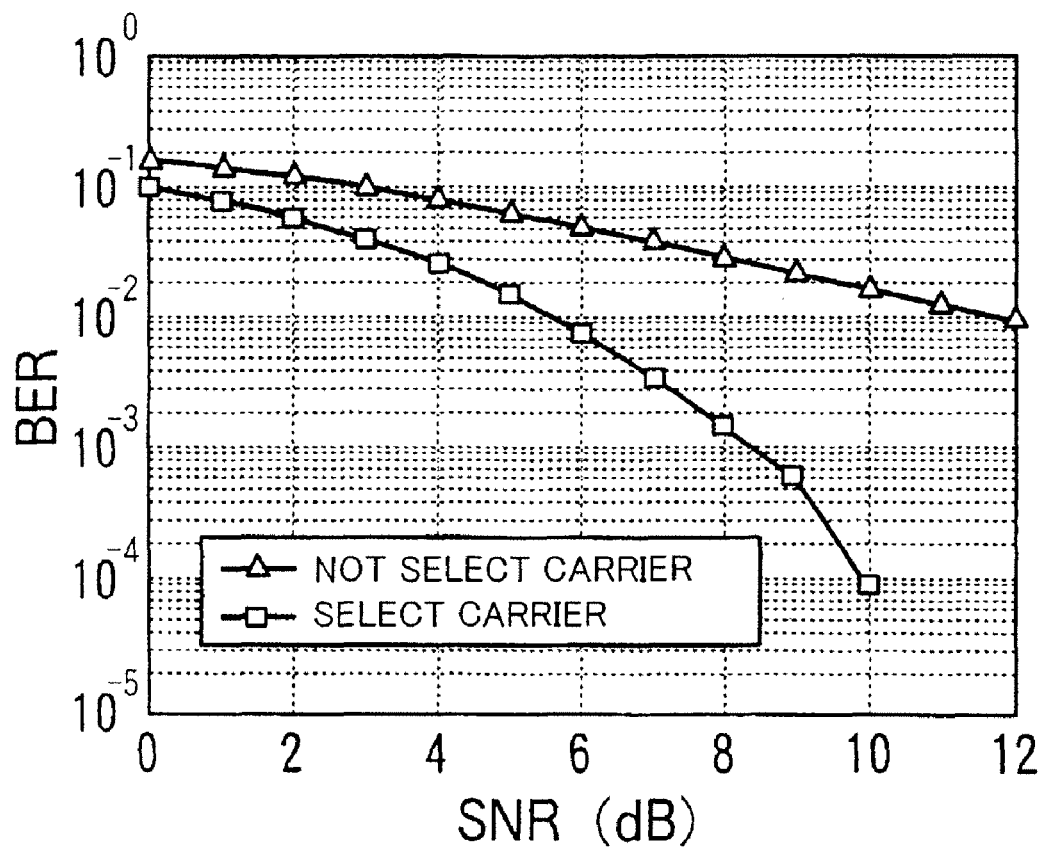
FIG. 11 illustrates the bit error rate performance in a carrier assignment method according to an embodiment of the present invention.

FIG. 11 illustrates the BER (Bit Error Rate) performance after carriers are selected based on the channel gain of the carriers. According to the simulation parameters shown in FIG. 11, the BPSK (Binariphase Phase Shift Keying) modulation is employed, the number of paths where input bit streams are not encoded is eight, and the power of each path decays exponentially (see FIG. 8). Further, a carrier block (comprised of 64 carriers) is assigned to user terminal U and the number of zero carriers selected is twelve.

As shown in FIG. 11, according to the above-described carrier assignment method, by not transmitting data using carriers where a reception level is low, it is possible to improve the BER performance. In this case, these carriers where a reception level is low are not used but consume frequency. If this is not seen as a problem, the average channel gain of a carrier block is improved, so that base station apparatus BS according to the multicell OFDMA system can improve transmission rates and spectrum efficiency using the modulation scheme of higher order.

A mode of a carrier assignment method in the multicell orthogonal frequency division multiple access system according to the present invention employs a configuration including the steps of: assigning in a base station apparatus, carrier blocks orthogonal to each other to adjacent sectors and reporting information on available carrier blocks to a terminal apparatus; transmitting in the terminal apparatus, a known symbol to the base station apparatus using the available carrier blocks; receiving in the base station apparatus, the known symbol and estimating an average channel gain of the available carrier block using the known symbol; comparing in the base station apparatus, a channel gain between the available carrier blocks, and preferentially assigning a carrier block having a large average channel gain as a carrier block to be used by the terminal apparatus; and comparing in the base station apparatus, the channel gain of each carrier included in the carrier block assigned to the terminal apparatus and selecting a carrier having a lower channel gain than a threshold so as not to transmit data by the carrier.

With this configuration, a base station apparatus preferentially assigns a carrier block having a greater average channel gain as a carrier block to be used by a terminal apparatus, and does not transmit data using a carrier where the channel gain of the carrier block assigned to a mobile terminal apparatus is lower than a threshold, so that it is possible to improve system capacity and bit error rate performance.

A mode of a carrier assignment method according to the present invention employs a configuration further including the step of, after the carrier block has been assigned to the terminal apparatus, starting in the base station apparatus, data transmission by a carrier channel other than a carrier having a lower channel gain than the threshold.

With this configuration, a base station apparatus starts data transmission using a carrier channel other than carriers having a lower channel gain than a threshold, so that it is possible to improve system capacity and bit error rate performance.

A mode of a carrier assignment method according to the present invention employs a configuration further including the step of, if the terminal apparatus connects with the multicell orthogonal frequency division multiple access system for the first time, estimating the channel gain using a timing symbol as the known symbol, and, if the terminal apparatus connects with the multicell orthogonal frequency division multiple access system for a second time or later, estimating the channel gain using a pilot symbol as the known symbol.

The channel estimation value is not known before a terminal apparatus connects with a channel at first, and, consequently, a base station apparatus cannot assign a carrier block to the terminal apparatus if channel gain is not known. With this configuration, the base station apparatus estimates the channel gain using a timing symbol as a known symbol if the terminal apparatus connects with the multicell orthogonal frequency division multiple access system for the first time, and, consequently, can assign a carrier block that improves system capacity and bit error rate performance, to the terminal apparatus.

A mode of a carrier assignment method according to the present invention employs a configuration further including the step of estimating the channel gain using a minimum mean square error method.

With this configuration, it is possible to estimate channel gain using the minimum mean square error method.

A mode of a carrier assignment method according to the present invention employs a configuration where the threshold is a half value of the average channel gain.

With this configuration, it is possible to prevent data transmission using a carrier having a lower channel gain than a half value of the average channel gain.

A mode of a carrier assignment method according to the present invention employs a configuration where the multicell orthogonal frequency division multiple access system includes a multicell, localized frequency division multiple access system.

With this configuration, by using the transmission scheme of the localized FDMA, it is possible to assign consecutive parts of carriers of all carriers in the OFDM symbol to a user terminal using a scheduling algorism.

A mode of a carrier assignment method according to the present invention employs a configuration where the multicell orthogonal frequency division multiple access system includes a multicell, distributed frequency division multiple access system.

With this configuration, by using the transmission scheme of the distributed FDMA, it is possible to distribute carriers to be assigned to the user terminal in each time slot, to all carriers of the OFDM symbol in the frequency domain.

A mode of a carrier assignment method according to the present invention employs a configuration where the multicell orthogonal frequency division multiple access system operates in the frequency division multiple scheme operation mode, decides whether carriers are assigned to the base station apparatus or carriers are assigned to the user terminal based on the amount of traffic in uplink and downlink, assigns carriers from a base station apparatus if a terminal apparatus downloads data from the base station apparatus, and assigns carriers from the terminal apparatus if the terminal apparatus uploads data to the base station apparatus.

With this configuration, whether carriers are assigned to the base station apparatus or carriers are assigned to the user terminal can be decided based on the amount of traffic in uplink and downlink, so that it is possible to improve the downlink transmission quality.

A mode of a carrier assignment method in the multicell orthogonal frequency division multiple access system according to the present invention employs a configuration where the multicell orthogonal frequency division multiple access system operates in the time division duplex mode and assigns carriers from a base station apparatus or a terminal apparatus.

With this configuration, in the TTD (Time Division Duplex) operation mode, the same operating frequency is shared and channel characteristics are opposite between uplink and downlink, and, consequently, a carrier assignment from the side of a base station apparatus to the side of a user terminal and a carrier assignment from the side of user terminal to the side of a base station apparatus are equivalent. As a result, it is possible to assign carriers easily.

A mode of a base station apparatus according to the present invention employs a configuration having: a reporting section that reports information on available carrier blocks to a terminal apparatus; an average channel gain estimating section that estimates an average channel gain of each carrier block using a known symbol mapped in the available carrier block and transmitted by the terminal apparatus; and a carrier block assigning section that compares an average channel gain between available carrier blocks, and preferentially assigns a carrier block having a large average channel gain as a carrier block to be used by the terminal apparatus.

With this configuration, it is possible to preferentially assign a carrier block having a large average channel gain as a carrier block to be used by a terminal apparatus.

A mode of a base station apparatus according to the present invention employs a configuration further having a carrier detecting section that detects a carrier having a lower channel gain than a predetermined threshold out of carriers included in the carrier block assigned to the terminal apparatus and where the base station apparatus does not transmit data using the carrier having the lower channel gain than the predetermined threshold.

With this configuration, data is not transmitted using a carrier where the channel gain of the carrier block assigned to a mobile terminal apparatus is lower than a threshold, so that it is possible to improve system capacity and bit error rate performance.

A mode of a base station apparatus according to the present invention employs a configuration where the base station apparatus commands the reporting section, the average channel gain estimating section and the carrier block assigning section to perform processing before communication is established, and, after the communication is established, transmits the data by a carrier having a channel gain equal to or greater than the predetermined threshold.

With this configuration, the base station apparatus starts data transmission using a carrier channel other than carriers having a lower channel gain than a threshold, so that it is possible to improve system capacity and bit error rate performance.

The present application is based on Chinese Patent Application No. 200510125462.7, filed on Nov. 17, 2005, the disclosure of the specification, drawings and abstract of which is expressly incorporated by reference herein.

INDUSTRIAL APPLICABILITY

The carrier assignment method in multicell orthogonal frequency division multiple access system according to the present invention can preferentially assign a carrier block having a large average channel gain as the carrier block used by the terminal apparatus and improve the system capacity and bit error rate performance, and consequently, is useful as a carrier assignment method in a multicell orthogonal frequency division multiple access system of information transmission system such as wireless LAN, fixed wireless access, mobile communication and terrestrial digital television broadcasting, using the OFDM technique, and of a communication method associated with the information transmission system.

The invention claimed is:

1. A carrier assignment method in a multicell orthogonal frequency division multiple access system, the method comprising:
   a reporting step of assigning, by a base station apparatus, a plurality of carrier blocks orthogonal to each other to a plurality of adjacent sectors, and reporting information on available carrier blocks to a terminal apparatus;
   a known symbol transmission step of transmitting, by the terminal apparatus, a known symbol group to the base station apparatus using all available carriers forming a plurality of available carrier blocks, which are reported to the terminal apparatus by the information on available carrier blocks;
   an estimation step of receiving, by the base station apparatus, the known symbol group transmitted from the terminal apparatus using all the available carriers forming the plurality of available carrier blocks, and estimating an average channel gain of each available carrier block using the received known symbol group;
   an assignment step of comparing, by the base station apparatus, the estimated average channel gains of the plurality of available carrier blocks, and preferentially assigning a carrier block having a large average channel gain as a carrier block to be used by the terminal apparatus; and
   a data transmission step of comparing, by the base station apparatus, channel gain of each available carrier in the assigned carrier block to be used by the terminal apparatus, selecting an available carrier having a channel gain equal to or greater than a threshold, and transmitting data by only the selected available carrier.

2. The carrier assignment method according to claim 1, wherein the data transmission step is performed after the carrier block has been assigned to the terminal apparatus.

3. The carrier assignment method according to claim 1, wherein, in the estimation step, if the terminal apparatus connects with the multicell orthogonal frequency division multiple access system for a first time, a timing symbol is used as the known symbol grow, and, if the terminal apparatus connects with the multicell orthogonal frequency division multiple access system for a second or subsequent time, a pilot symbol is used as the known symbol group.

4. The carrier assignment method according to claim 1, wherein, in the estimation step, the average channel gain is estimated using a minimum mean square error method.

5. The carrier assignment method according to claim 1, wherein, in the data transmission step, the threshold is a half value of the average channel gain.

6. The carrier assignment method according to claim 1, wherein the multicell orthogonal frequency division multiple access system comprises a multicell, localized frequency division multiple access system.

7. The carrier assignment method according to claim 1, wherein the multicell orthogonal frequency division multiple access system comprises a multicell, distributed frequency division multiple access system.

8. A base station apparatus comprising:
   a reporting section that reports information on available carrier blocks to a terminal apparatus, the reported information indicating a plurality of available carrier blocks;
   an average channel gain estimating section that estimates an average channel gain of each carrier block using a known symbol group mapped in all available carriers forming the plurality of available carrier blocks, the known symbol group being transmitted by the terminal apparatus; and
   a carrier block assigning section that compares the estimated average channel gains of the plurality of available carrier blocks, and preferentially assigns a carrier block having a large average channel gain as a carrier block to be used by the terminal apparatus.

9. The base station apparatus according to claim 8, further comprising a carrier detecting section that detects an available carrier having a lower channel gain than a predetermined threshold out of carriers included in the carrier block assigned to the terminal apparatus.

10. The base station apparatus according to claim 9, wherein the base station apparatus commands the reporting section, the average channel gain estimating section and the carrier block assigning section to perform processing before communication is established, and, after the communication is established, transmits data by an available carrier having a channel gain equal to or greater than the predetermined threshold.

* * * * *